Oct. 20, 1925.
A. M. ZUCKERMAN
1,558,140
WEB CUTTING MECHANISM
Filed April 19, 1923      3 Sheets-Sheet 3
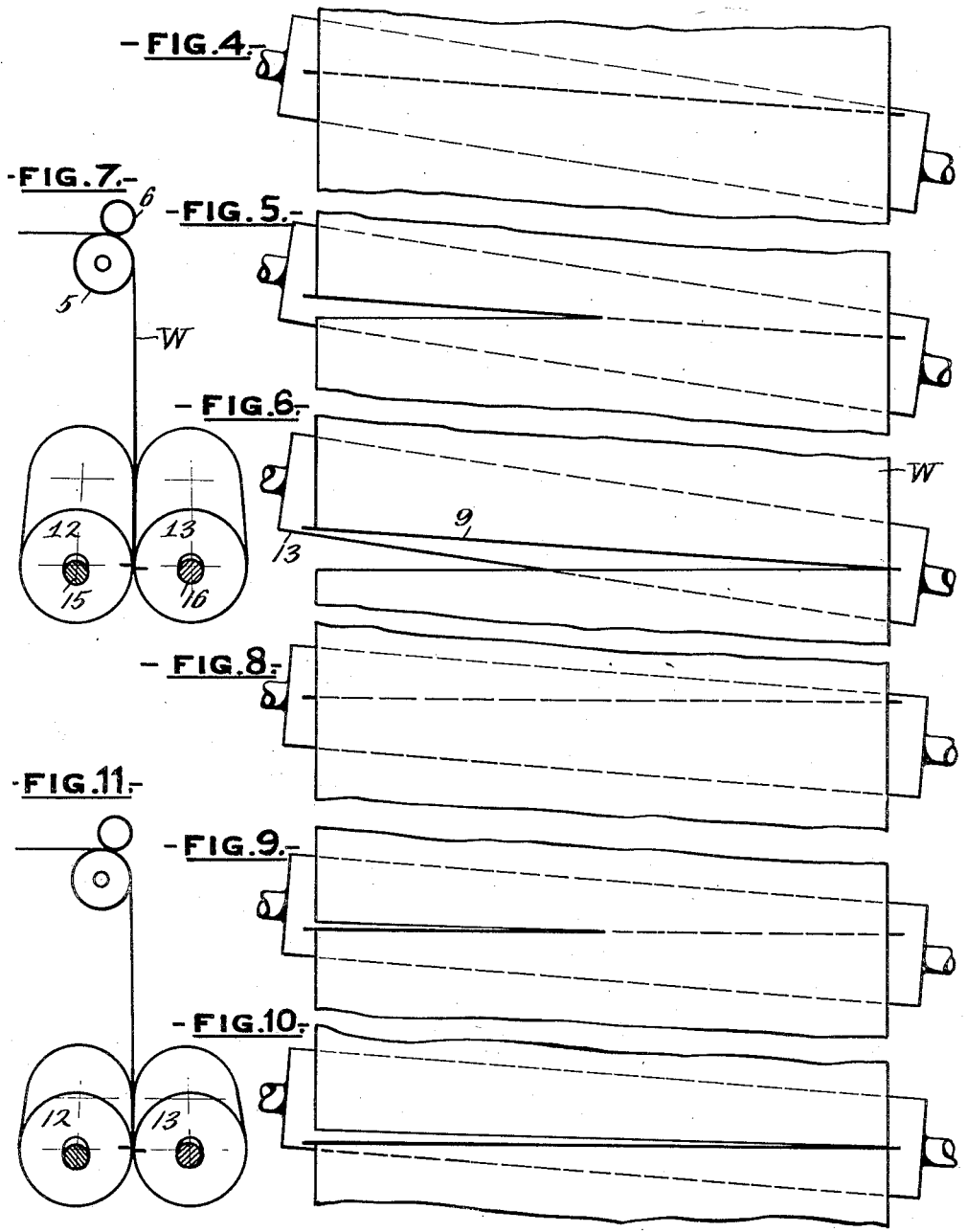
INVENTOR.
Adolph M. Zuckerman
By
Philipp Sawyer Rice Kennedy
ATT'YS.

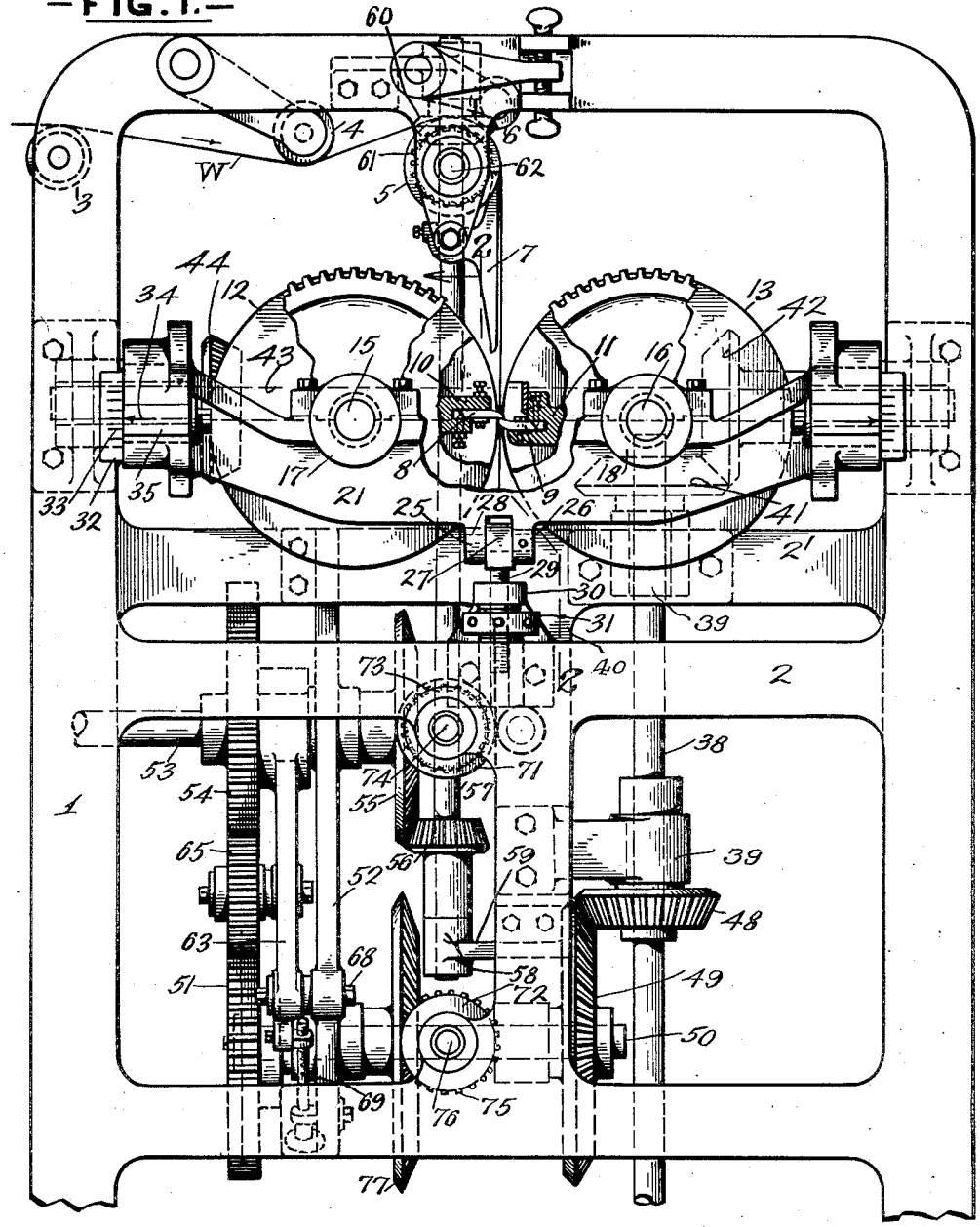

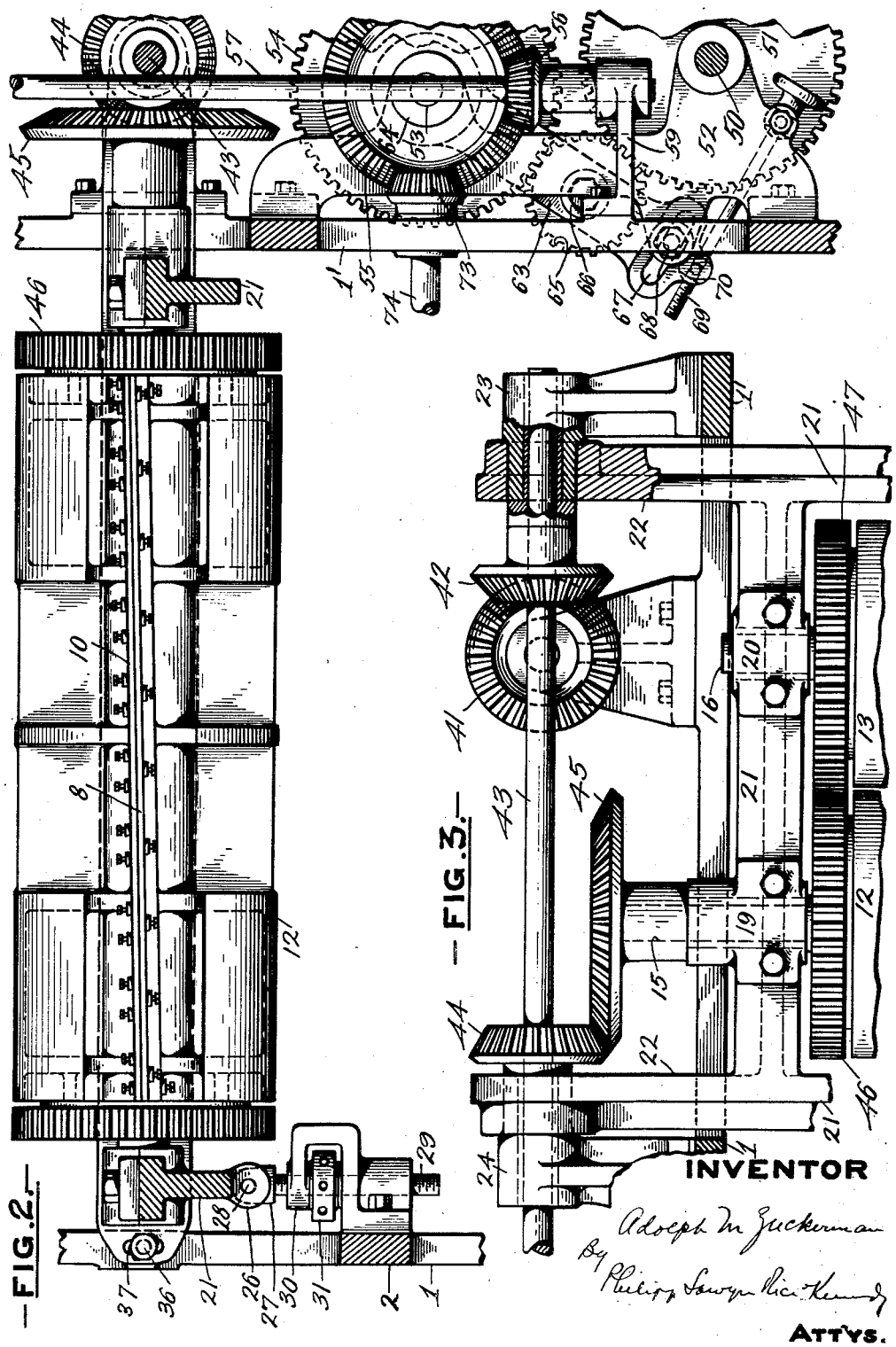

Patented Oct. 20, 1925.

1,558,140

UNITED STATES PATENT OFFICE.

ADOLPH M. ZUCKERMAN, OF NEW YORK, N. Y., ASSIGNOR, BY MESNE ASSIGNMENTS, TO R. HOE AND CO., INC., OF NEW YORK, N. Y., A CORPORATION OF NEW YORK.

WEB-CUTTING MECHANISM.

Application filed April 19, 1923. Serial No. 633,105.

*To all whom it may concern:*

Be it known that I, ADOLPH M. ZUCKERMAN, a citizen of the United States, residing at New York, county of New York, and State of New York, have invented certain new and useful Improvements in Web-Cutting Mechanism, fully described and represented in the following specification and the accompanying drawings, forming a part of the same.

This invention relates to certain improvements in cutting mechanisms for cutting sheets from webs, particularly webs coming from printing machines.

In producing printed products in high speed rotary printing machines the products are produced by printing on a web and then cutting sheets from the web to produce the products desired. In this class of machines it is frequently desirable to produce products having varying sheet lengths. In cutting off sheets of varying lengths particularly with cutting mechanisms operating to produce a shear cut, it has been generally the custom to employ a pair of cutting cylinders with means for driving these cylinders with an irregular motion so that by properly setting the cylinders the cutting knives could be timed to effect the cut at the time when the peripheral speed of the cylinders were equal to that of the web passing between the cylinders and from which the sheets were to be cut.

The mechanism by which this adjustment was effected was necessarily more or less complicated and it was difficult to properly adjust the cylinders and retain them in their adjusted position so as to effect the cut at the proper time for cutting different length sheets from webs passing between the cutting elements at different speeds depending on the length of the sheet to be cut. Furthermore, owing to the character of the mechanism necessary to effect this movement of the cutting cylinders the cutting mechanism and the supporting frames therefor had to be of very great strength and rigidity calling for the use of an excessive amount of metal and making, therefore, a very expensive construction to build.

Furthermore, for these and other reasons the speed of this kind of cutter has been somewhat more limited than is desired in high speed rotary machines.

It is the particular object of the present invention to provide an improved cutting mechanism, the speed of which is constant so as to overcome the objection referred to and which can be mounted so as to make a straight cut in a web to sever therefrom sheets of varying length irrespective of whether the web is passing through the cutting mechanism at a speed greater or less than the peripheral speed of the elements.

It is a further object of the invention to produce a simple light mounting for the mechanism and one by which the cylinders may be adjusted while the machine is running so as to vary the angle of the cutting line relatively to the web path whereby a straight cut is produced irrespective of the web speed. With these and other objects not specifically referred to in view, the invention consists in certain novel parts, arrangements, and combinations, which will be fully described in connection with the accompanying drawings and the novel features thereof pointed out in the claims hereunto annexed.

Referring now to these drawings—

Figure 1 is an end view, partly broken away, of an improved cutting mechanism and its associated driving mechanism, the cutting mechanism shown operating to produce a shear cut.

Figure 2 is a longitudinal partly sectional view, partly broken away, the view being taken on line 2—2 of Fig. 1, looking in the direction of the arrow in that figure.

Figure 3 is a plan view, partly in section and partly broken away, of the rear side of the construction shown in Fig. 1 illustrating the driving connections for the cutting cylinders.

Figures 4, 5 and 6 diagrammatically illustrate the position of the cutting cylinders relatively to the sheet web path when cutting a certain length sheet.

Figure 7 is a diagrammatic end view of Figs. 4, 5 and 6 illustrating the angle assumed by the cutting cylinders when adjusted to the position shown in those figures.

Figures 8, 9, and 10 show the angle of the cylinders relatively to the web path when cutting a different length sheet.

Figure 11 is a diagrammatic end view of Figs. 8, 9 and 10 illustrating the angle to which the cutting cylinders are adjusted.

In these drawings a preferred mechanism for effecting the object of the invention is shown and will be now described in detail.

The cutting mechanism illustrated is one operating to cut a sheet from a web with a shear or clean cut. As shown, this cutting mechanism is supported in front and rear frames 1 and 1', these frames being connected by cross frames 2 and 2' of any usual or desired configuration, and the web W is led to the cutting mechanism over a guide roll 3 and a tension roll 4 to a pair of feeding rolls 5, 6 over a guide 7 to the cutter. These cutters, in the construction illustrated, are a pair of knives 8, 9 having cutting faces shaped to produce a shear cut, these knives being mounted in knife supports 10, 11 carried by rotary carriers as cylinders, 12, 13 supported on shafts 15 and 16, each knife, as illustrated in Fig. 2, being arranged on its cylinder so as to be slightly diagonal to the axis thereof.

These cylinders are driven at a constant speed. As the web is fed between them at speeds which vary relatively to the peripheral speed of the cutting cylinders so as to produce sheets of different lengths, means are provided for varying the angle of the cutting line of the cylinders relatively to the line of travel of the web so as to vary the length of the cutting action in order to obtain a straight cut, the cylinders being mounted so that they can be set at the proper angle to effect this. In the particular construction shown the cylinder shafts are journaled at one end in journals 17, 18 and at their other end in journals 19, 20 (see Fig. 3) in a frame 21 having extensions 22 by which it is pivotally mounted on brackets 23, 24 supported on the main rear framing 1', before referred to. At its front or the end opposite the pivots and as best shown in Figs. 1 and 2, the pivoted frame 21 is provided with a pair of lugs or ears, 25, 26, between which is pinned a block 27 by a pin 28, this block carrying one end of an adjusting screw 29 which takes bearing in a yoke bracket 30 mounted on the front main frame 1, before referred to. This screw is provided with a regulating nut 31 so positioned that by manipulating it through any suitable tool the front end of the frame 21 will be raised or lowered on the rear pivots. With this construction the angle of the cutting knives relatively to the line of travel of the web may be varied as desired and the length of the cutting action varied as the angle is varied, and this adjustment can be effected very easily and readily and while the machine is running.

In the best construction, means are provided which will indicate the angle to which the pivoted frame should be adjusted for a sheet of given length. In the construction illustrated, this is effected by providing a flat 32 on the main frame 1, this flat being provided with indicating marks 33 with which may register a pointer 34 carried on a flat 35 on the front of the swinging frame 21, before referred to. The front of the swinging frame may be secured in position in the front main frame 1 by means of bolts 36 in the frame which work in elongated slots 37 formed in the front side of the swinging frame 21, before referred to, one of these bolts and slot connections being shown at the left hand side in Fig. 2.

In machines embodying the present invention when the cutting mechanism is employed with a printing machine the cutting cylinders are driven at the same speed as the printing elements. In the particular construction illustrated the cylinders are driven through connections which include a vertical shaft 38 suitably journaled in brackets 39 secured to framing 40 connecting the rear cross frame 2', before referred to. The upper end of this shaft is secured to a miter gear 41 (see Fig. 3) which engages a miter 42 on a shaft 43, this shaft at its other end being provided with a miter 44 engaging with a gear 45 on the rear end of the shaft 15 of the cutting cylinder 12, before referred to. This cutting cylinder 12 also carries at each end a gear 46 (see Fig. 2) which meshes with similar gears 47 on each end of the cutting cylinder 13. The shaft 38 is suitably driven from the printing mechanism, not shown, so that the cutters will make turn for turn with the printing couples of such printing mechanism.

As longer or shorter sheets are to be cut by the cutting mechanism, means must be provided for adjusting or regulating the feeding mechanism 5, 6, before referred to, to suitably supply the length of web for the sheet of predetermined length, and such mechanism is provided by the present invention. As shown this is effected through the following connection—

The vertical power shaft 38, before referred to, is provided with a miter 48 which engages with a miter 49 on a shaft 50 which carries on its end a gear 51, this shaft being supported at its end in a bracket 52 projecting from the main rear frame 1', before referred to. This bracket, also, supports above the shaft 50 a second shaft 53 on which is supported at its outer end a gear 54 and at its inner end a miter 55 which engages with a miter 56 on a vertical shaft 57 supported at its lower end in bearings 58 rising from a bracket 59 secured to the frame of the machine.

On the upper end of this vertical shaft is a miter 60 shown in dotted lines at the top of Fig. 1, this miter engaging with a miter 61 on the shaft 62 of the feeding rolls 5, before referred to, the feeding rolls thus being driven to advance a predetermined sheet length.

The means whereby these feeding means are regulated for different sheet lengths include in the specific construction illustrated a lever 63 pivoted at 64 in the bracket 52, before referred to, this lever carrying an intermediate gear 65 mounted on a stud 66 secured in the lever arm. This intermediate gear 65 forms the connection between the gear 51 and the gear 54 by which the feeding rolls are driven through the connection just described.

When it is desired to make a change in the length of the product the gear 51 is removed and another gear of the required proportion to effect the desired change in the feeding action of the feeding rolls is substituted. The end of the lever arm 63 beyond the gear is formed with an elongated slot 67 which works over a bolt 68 in the framing 1' of the machine and this arm is or may be adjusted by means of an adjusting screw 69 taking through a threaded projection 70 on the end of the lever arm, this adjusting screw being supported in the bracket 52, before referred to. With this construction the gears of different size may be placed on the bracket and yet the correct relation of this gear and the gears 65 and 54 will be maintained.

In the construction illustrated forwarding means may be provided for forwarding the cut sheets, and in the construction illustrated, these forwarding means are driven rolls which co-operate with suitable guides, not illustrated, for reason of clarity. These forwarding rolls are preferably spaced apart vertically and are driven in any suitable manner. In the particular construction illustrated also are shown a pair of rolls 71, 72 (see Fig. 1). The roll 71 is driven by means of a miter 73 on the roll shaft 74, this miter meshing with the miter 55, before referred to. The roll 72 is driven by means of a miter 75 on the roll shaft 76, this miter meshing with a miter 77 on the shaft 50, before referred to.

The operation of the mechanism is believed to be clear from the above description. It may be stated, however, that the length of time required for the complete cutting action depends on the angle the cylinders are placed relatively to the line of travel of the web. In order to obtain a straight or perpendicular cut widthwise of the web the cylinders are set at such an angle to the line of travel of the paper that the length of the complete cutting action equals the length of the paper passing between them during the time of the cut. This is diagrammatically illustrated in Figs. 4 to 11 inclusive.

In Figs. 4 to 7 is diagrammatically illustrated the position of the cylinders relatively to the line of travel of the web when a longer sheet is being cut, Fig. 4 showing the start of the cut; Fig. 5 the cut half completed; and Fig. 6 the cut fully completed.

Figs. 8, 9 and 10 show the position to which the cylinders are set relatively to the web path when a shorter sheet is to be cut, the angle of the inclination being less.

With the construction as described, sheets of varying length may be clean cut with the cutting cylinders running at a constant speed, this eliminating the various complicated motions heretofore defined for regulating the speed of the cutting cylinders to the speed of the sheet. This adjustment, furthermore, can be made while the machine is running, and a very simple and effective means for making this adjustment is provided. Furthermore, the mechanism can be adjusted to cut sheets of considerable varying lengths by the simple removal and substitution of a single gear.

While the invention has been shown and described in its preferred form, it will be understood that various changes may be made in the specific structure described without departing from the invention.

What I claim is:

1. The combination of web forwarding mechanism, means for varying the speed thereof to feed more or less web, cutting mechanism for cutting sheets from the web, a support therefor, and means for adjusting the cutting mechanism support while the machine is running to vary the length of the cutting action for cutting different length sheets.

2. The combination of web forwarding mechanism, means for varying the speed thereof to feed more or less web, cutting mechanism for cutting sheets from the web, and means for varying the angle of the cutting line relatively to the line of travel of the web.

3. The combination of web forwarding mechanism, cutting mechanism for producing a shear cut from the web running at a constant speed, means for varying the web speed, and means for varying the angle of the cutting line relatively to the line of travel of the web to vary the length of the cutting action for cutting different length sheets.

4. The combination of web forwarding mechanism, cutting mechanism for producing a shear cut from the web running at a constant speed, means for varying the web speed, and means for varying the angle of the cutting line relatively to the line of travel of the web.

5. The combination of a web forwarding mechanism, means for varying the speed thereof to feed more or less web, a pair of cutting cylinders having knives cooperating to produce a shear cut for cutting sheets from the web, and means for varying the angle of the cutting line relatively to the line of travel of the web.

6. The combination of means for forwarding a web at different speeds, a pair of pivotally mounted cutting cylinders to which the web is forwarded, means for rocking the cylinders to vary their cutting angle relatively to the web path, and means for driving the cylinders.

7. The combination of means for forwarding a web at different speeds, a pair of pivotally mounted cutting cylinders to which the web is forwarded, means for rocking the cylinders to vary their cutting angle relatively to the web path, means for driving the cylinders, and means for locking the cylinders in adjusted position.

8. The combination of a pair of cutting cylinders driven at a constant speed, a pivoted frame in which the cylinders are mounted, means for rocking the frame, a web forwarding roll, and means for driving the roll at varying speeds.

9. The combination of a pair of cutting cylinders driven at a constant speed, a pivoted frame in which the cylinders are mounted, means for rocking the frame, a web forwarding roll, and means for driving the roll at speeds varying from the speed of the cutting cylinders.

10. The combination of a pair of cutting cylinders each having a knife cooperating to produce a shear cut and driven at a constant speed, a pivoted frame in which the cylinders are mounted, means for rocking the frame, a web forwarding roll, and means for driving the roll at varying speeds.

In testimony whereof, I have hereunto set my hand.

ADOLPH M. ZUCKERMAN.